United States Patent
Zhao et al.

(10) Patent No.: US 12,423,970 B1
(45) Date of Patent: Sep. 23, 2025

(54) METHOD AND SYSTEM FOR CROP MAPPING ACROSS LARGE REGIONS WITH LOW SAMPLE DEPENDENCE

(71) Applicant: Institute Of Agricultural Resources And Regional Planning, Chinese Academy Of Agricultural Sciences, Beijing (CN)

(72) Inventors: Hongwei Zhao, Beijing (CN); Jia Liu, Beijing (CN); Wenbin Wu, Beijing (CN); Lei Wang, Beijing (CN); Ruoyun Xing, Beijing (CN)

(73) Assignee: INSTITUTE OF AGRICULTURAL RESOURCES AND REGIONAL PLANNING, CHINESE ACADEMY OF AGRICULTURAL SCIENCES, Beijing (CN)

( * ) Notice: Subject to any disclaimer, the term of this patent is extended or adjusted under 35 U.S.C. 154(b) by 0 days.

(21) Appl. No.: 19/020,448

(22) Filed: Jan. 14, 2025

(30) Foreign Application Priority Data

Jun. 4, 2024 (CN) .......................... 202410711366.3

(51) Int. Cl.
*G06V 10/771* (2022.01)
*G06V 10/26* (2022.01)
(Continued)

(52) U.S. Cl.
CPC .......... *G06V 20/188* (2022.01); *G06V 10/267* (2022.01); *G06V 10/72* (2022.01);
(Continued)

(58) Field of Classification Search
CPC ............. G06V 20/188; G06V 10/7715; G06V 10/751; G06V 10/267; G06V 10/72; G06V 10/776; G06V 10/764
See application file for complete search history.

(56) References Cited

U.S. PATENT DOCUMENTS

| 2022/0067614 A1* | 3/2022 | Guan | G06Q 10/06315 |
| 2023/0107444 A1* | 4/2023 | Anderson | G06V 20/188 |
| | | | 382/110 |

FOREIGN PATENT DOCUMENTS

| CN | 114612794 A | 6/2022 |
| CN | 116883853 A | 10/2023 |

(Continued)

OTHER PUBLICATIONS

Notification to Grant Patent Right for Invention, Chinese Application No. 202410711366.3, mailed Jul. 22, 2024 (3 pages).
(Continued)

*Primary Examiner* — David F Dunphy
(74) *Attorney, Agent, or Firm* — HOWARD M COHN and Associates, LLC (57) ABSTRACT

The present invention belongs to the technical field of crop mapping based on remote-sensing images, and relates to a method and system for crop mapping across large regions with low sample dependence. The method includes: acquiring remote sensing data, ground sample data, meteorological data, soil data, establishing geographically divided crop planting regions; establishing key growth period model libraries corresponding to individual crop regions; constructing machine learning models based on a plurality of machine learning algorithms, to obtain machine learning crop extraction models; selecting an optimal machine learning crop extraction model; acquiring a spatial crop distribution base map; performing product correction based on the disaster information; and acquiring a regional crop map using a target crop extraction model adapted for the disaster response. The present invention, achieve high-accuracy and large-scale crop mapping, and reduce the crop sample dependence of crop mapping.

9 Claims, 3 Drawing Sheets

(51) Int. Cl.
  *G06V 10/72* (2022.01)
  *G06V 10/75* (2022.01)
  *G06V 10/764* (2022.01)
  *G06V 10/77* (2022.01)
  *G06V 10/776* (2022.01)
  *G06V 20/10* (2022.01)

(52) U.S. Cl.
  CPC .......... *G06V 10/751* (2022.01); *G06V 10/764* (2022.01); *G06V 10/7715* (2022.01); *G06V 10/776* (2022.01)

(56) References Cited

FOREIGN PATENT DOCUMENTS

| CN | 117953278 A | 4/2024 |
|---|---|---|
| GB | 2620469 A | 1/2024 |

OTHER PUBLICATIONS

CNIPA, First Office Action issued for Chinese Application No. 202410711366.3, mailed Jul. 8, 2024 (6 pages).

Qian Song et al., Exploration into the Development Direction of Remote Sensing Mapping of Crop Spatial Distribution, published in Chinese Journal of Agricultural Resources and Regional Planning, vol. 41, No. 6, pp. 57-65 issued on Jun. 25, 2020 (9 pages).

Wengeng Cao et al., Landslide disaster vulnerability mapping study in Henan Province: Comparison of different machine learning models, published in Geological science and technology Bulletin, vol. 44, No. 1, issued on Dec. 28, 2023 (11 pages).

Alex O. Onojeghuo et al., Mapping paddy rice fields by applying machine learning algorithms to multi-temporal Sentinel-1A and Landsat data, published in International Journal of Remote Sensing, vol. 39, Nos. 3-4, 1042-1067, issued Nov. 2, 2017 (26 pages).

* cited by examiner

METHOD AND SYSTEM FOR CROP MAPPING ACROSS LARGE REGIONS WITH LOW SAMPLE DEPENDENCE

BACKGROUND OF THE INVENTION

1. Technical Field

The present invention belongs to the technical field of crop mapping based on remote-sensing images, and in particular relates to a method and system for crop mapping across large regions with low sample dependence.

2. Description of Related Art

Remote sensing monitoring systems for agricultural conditions provide information support for agricultural macro decision making by monitoring and predicting the area, growth, soil moisture and yield of regional crops using various satellite, meteorological and ground observation data or the like in China and abroad every year. Spatial crop distribution base maps across large regions, as the key information for monitoring agricultural conditions, address the problem with crop planting region selection, and provide information support for the growth and yield of crop.

At present, the main problems encountered by macro-level crop mapping across large regions include: great differences in agricultural planting across large regions due to topography and landforms, soil, climate and other reasons, and poor adaptability of crop mapping models; low accuracy in crop recognition due to agricultural disasters or the like; and high cost in acquisition of large-area ground sample data. Existing crop mapping models are typically limited by regions, time, and spatial mobility. In particular, in the actual operation of the business, many factors need to be considered for high-accuracy and large-scale crop mapping, leading to high dependence on crop samples.

BRIEF SUMMARY OF THE INVENTION

In order to solve the above technical problems, the present invention provides a method and system for crop mapping across large regions with low sample dependence.

In a first aspect, the present invention provides a method for crop mapping across large regions with low sample dependence, including:
  acquiring remote sensing data, ground sample data, meteorological data, soil data, basic geographic data and disaster data, the ground sample data including crop type and geographic crop information;
  establishing geographically divided crop planting regions according to crop growth periods, the meteorological data, the soil data, and basic geographic data;
  establishing key growth period model libraries corresponding to individual crop regions, including: calculating a normalized difference vegetation index and an enhanced vegetation index, and performing declouding using a declouding algorithm by means of a cloud mask produced by cloud projection of dark pixels; removing outliers using a smoothing method, and extracting, based on sample points, pixels points as a crop supervision dataset; and assigning the ground sample data to the geographically divided crop planting regions according to geographical coordinates, supplementing sample data based on a Google platform according to sizes of the geographically divided crop planting regions, and cleaning and correcting offset ground data;
  constructing machine learning models based on a plurality of machine learning algorithms in combination with the remote sensing data in the individual geographically divided crop planting regions and during the individual crop growth periods, respectively, to obtain machine learning crop extraction models corresponding to the individual machine learning algorithms;
  calculating overall classification accuracy of the individual machine learning crop extraction models, selecting an optimal machine learning crop extraction model among the regions, and determining model parameters;
  acquiring a spatial crop distribution base map using the optimal machine learning crop extraction model;
  performing product correction based on the disaster information, including: in a case where a disaster occurs, determining an abnormal crop recognition region by comparing a current crop map with the spatial crop distribution base map; increasing crop extraction samples in the abnormal crop recognition region, establishing crop extraction models adapted for a disaster response based on a plurality of machine learning algorithms, respectively, and evaluating the individual crop extraction models adapted for the disaster response based on the overall classification accuracy, to obtain a target crop extraction model adapted for the disaster response; and supplementing sample information for a current growth season to correct a target crop extraction model adapted for the disaster response for a last growth period; and
  acquiring a regional crop map using the target crop extraction model adapted for the disaster response.

In a second aspect, the present invention provides a system for crop mapping across large regions with low sample dependence, including: an acquisition unit, a geographically divided crop planting region establishment unit, a key growth period model library establishment unit, a machine learning model construction unit, a unit selection unit, an extraction unit, a correction unit, and an output unit, wherein
  the acquisition unit is configured to acquire remote sensing data, ground sample data, meteorological data, soil data, basic geographic data and disaster data, the ground sample data including crop type and geographic crop information;
  the geographically divided crop planting region establishment unit is configured to establish geographically divided crop planting regions according to crop growth periods, the meteorological data, the soil data, and basic geographic data;
  the key growth period model library establishment unit is configured to establish key growth period model libraries corresponding to individual crop regions, including: calculating a normalized difference vegetation index and an enhanced vegetation index, and performing declouding using a declouding algorithm by means of a cloud mask produced by cloud projection of dark pixels; removing outliers using a smoothing method, and extracting, based on sample points, pixels points as a crop supervision dataset; and assigning the ground sample data to the geographically divided crop planting regions according to geographical coordinates, supplementing sample data based on a Google platform according to sizes of the geographically divided crop planting regions, and cleaning and correcting offset ground data;
  the machine learning model construction unit is configured to construct machine learning models based on a plurality of machine learning algorithms in combination with the remote sensing data in the individual geographically divided crop planting regions and during the individual crop growth periods, respectively, to obtain machine learning crop extraction models corresponding to the individual machine learning algorithms;

the model selection unit is configured to calculate overall classification accuracy of the individual machine learning crop extraction models, selecting an optimal machine learning crop extraction model among the regions, and determining model parameters;

the extraction unit is configured to acquire a spatial crop distribution base map using the optimal machine learning crop extraction model;

the correction unit is configured to perform product correction based on the disaster information, including: in a case where a disaster occurs, determining an abnormal crop recognition region by comparing a current crop map with the spatial crop distribution base map; increasing crop extraction samples in the abnormal crop recognition region, establishing crop extraction models adapted for a disaster response based on a plurality of machine learning algorithms, respectively, and evaluating the individual crop extraction models adapted for the disaster response based on the overall classification accuracy, to obtain a target crop extraction model adapted for the disaster response; and supplementing sample information for a current growth season to correct a target crop extraction model adapted for the disaster response for a last growth period; and the output unit is configured to acquire a regional crop map using the target crop extraction model adapted for the disaster response.

On the basis of the above technical solutions, the present invention may be further improved as follows.

Further, the remote sensing data include image data and spectroscopic data during the crop growth periods; the meteorological data include data of monthly average precipitation, temperature and evaporation during the crop growth periods; the soil data include soil type data and soil salinity and alkalinity data; the basic geographical data include digital altitude data and topographic data; and the disaster data involve regions affected by floods and droughts in a current year.

Further, establishing the geographically divided crop planting regions according to the crop growth periods, the meteorological data, the soil data, and basic geographic data includes:

unifying the meteorological data, the soil data, and the geographic crop information during the crop growth periods into the same coordinate system;

standardizing individual secondary indexes of the meteorological data;

performing correlation analysis on meteorological elements to calculate a correlation coefficient matrix;

extracting feature values of the individual indexes and feature vectors corresponding to the feature values, to calculate contribution rates of principal components; and acquiring spatially constrained clustering results by searching for spatially adjacent element clusters based on attribute values of meteorological elements, soil and basic geographic information elements of the principal component, to obtain the geographically divided crop planting regions.

Further, standardizing the individual secondary indexes of the meteorological data includes:

assuming that $x_{ij}$ is a value of a jth pixel of an ith index, $x_i$ is a value of all pixels of the ith index, $\overline{x_i}$ is an average value of all the pixels of the ith index, $\sqrt{v(x_i)}$ is a standard deviation of all the pixels of the ith index, n is a maximum value of i, p(1) is a maximum value of j, i=1, 2, ..., n, and j=1, 2, ..., p(1), and supposing that each index has an average value of 0 and a variance of 1, then:

$$x_{ij} = \frac{x_{ij} - \overline{x_i}}{\sqrt{v(x_i)}}.$$

Further, performing the correlation analysis on the meteorological elements to calculate the correlation coefficient matrix includes: assuming that $x_i$ is a value of all pixels of an ith index, $x_j$ is a value of all pixels of a jth index, $\overline{x_i}$ is an average value of all the pixels of the ith index, $\overline{x_j}$ is an average value of all the pixels of the jth index, $r_{ij}$ is a correlation coefficient between $x_i$ and $x_j$, the correlation coefficient matrix is R, n is a maximum value of i, p is a maximum value of j, $x_n$ is a value of all pixels of an nth index, $x_p$ is a value of all pixels of a pth index, $r_{np}$ is a correlation coefficient between $x_n$ and $x_p$, i=1, 2, 3, ... n, j=1, 2, 3, ..., p, k indicates a kth index, $x_{ki}$ indicates an ith pixel of a kth index, and $x_{kj}$ indicates a jth pixel of a kth index, then:

$$r_{ij} = \frac{\sum_{i=1}^{n}|x_{ki} - \overline{x_i}||x_{kj} - \overline{x_j}|}{\sqrt{\sum_{i=1}^{n}(x_{ki} - \overline{x_i})^2(x_{kj} - \overline{x_j})^2}}; \text{ and}$$

$$R = \begin{pmatrix} r_{11} & r_{12} & \cdots & r_{1p} \\ r_{21} & r_{22} & \cdots & r_{2p} \\ \vdots & \vdots & \cdots & \vdots \\ r_{n1} & r_{n2} & \cdots & r_{np} \end{pmatrix}.$$

Further, extracting the feature values of the individual indexes and the feature vectors corresponding to the feature values to calculate the contribution rates of the principal components include: assuming that i indicates an ith index, j indicates a jth index, n is a maximum value of i, p is a maximum value of j, $x_n$ is a value of all pixels of an nth index, $x_p$ is a value of all pixels of a pth index, the correlation coefficient matrix is R, a feature value of the ith index is $\lambda_i$, a feature value of a pth index is $\lambda_p$, I is a unit matrix, and $r_{np}$ is a correlation coefficient between $x_n$ and $x_p$, and supposing that $|R-\lambda_1 I|=0, |R-\lambda_2 I|=0, \ldots, |R-\lambda_p I|=0$, then:

$$\begin{pmatrix} r_{11}-\lambda_1 & r_{12} & \cdots & r_{1p} \\ r_{21} & r_{22}-\lambda_2 & \cdots & r_{2p} \\ \vdots & \vdots & \cdots & \vdots \\ r_{n1} & r_{n2} & \cdots & r_{np}-\lambda_p \end{pmatrix} = 0;$$

assuming that a feature vector corresponding to a feature value $\lambda_i$ of each index is $\mu_i$, i=1, 2, 3, ..., p, a principal component is $y_i$, and a variance contribution rate of the principal component is $\varepsilon_i$, then:

$$\varepsilon_i = \frac{\lambda_i}{\sum_{i=1}^{p} \lambda_i};$$

and an accumulated contribution rate of an mth principal component is:

$$\sum_{i=1}^{m} \varepsilon_i = \frac{\sum_{i=1}^{m} \lambda_i}{\sum_{i=1}^{p} \lambda_i}.$$

Further, a grid surface with a given pixel size is constructed, grid data are acquired, grids are taken as basic analysis units, a unified geographic projection are set with meteorological elements, soil data, and basic geographic information data of principal components, and pixels values of the grid data after the geographic projection are assigned to point data; and spatially adjacent element clusters are searched based on attribute values of the meteorological elements, soil data, and basic geographic information elements of the principal components, to obtain spatially constrained clustering results, which are superimposed with county territory data to obtain division region results.

Further, the machine learning algorithms include a random forest algorithm, a support vector machine algorithm, and an extreme gradient boosting tree algorithm.

The present invention has the following beneficial effects: by establishing the geographically divided crop planting regions, establishing the key growth period model libraries corresponding to the individual crop regions, performing product correction based on the disaster information, and selecting the optimal machine learning crop extraction model for the regions by calculating the overall classification accuracy of the individual machine learning crop extraction models, the present can solve the problems of great differences in agricultural planting across large regions and poor model adaptability due to topography and landforms, soil, climate and other reasons, and improve the crop recognition accuracy across large regions, to provide more reliably information support for the growth and yield of crop; and the present invention eliminates the limitation of region, time and spatial mobility in the existing crop mapping models, achieves high-accuracy and large-scale crop mapping, and reduces the crop sample dependence and cost for crop mapping.

DETAILED DESCRIPTION OF THE INVENTION

In order to make the objects, technical solutions and advantages of the embodiments of the present invention clearer, the following clearly and completely describes the technical solutions in the embodiments of the present invention in conjunction with the accompanying drawings in the embodiments of the present invention. Obviously, the described embodiments are some instead of all of the embodiments of the present invention. In general, the components in the embodiments of the present application as described and shown in the accompanying drawings herein can be arranged and designed in a variety of different configurations.

Embodiment 1

Figure 1:
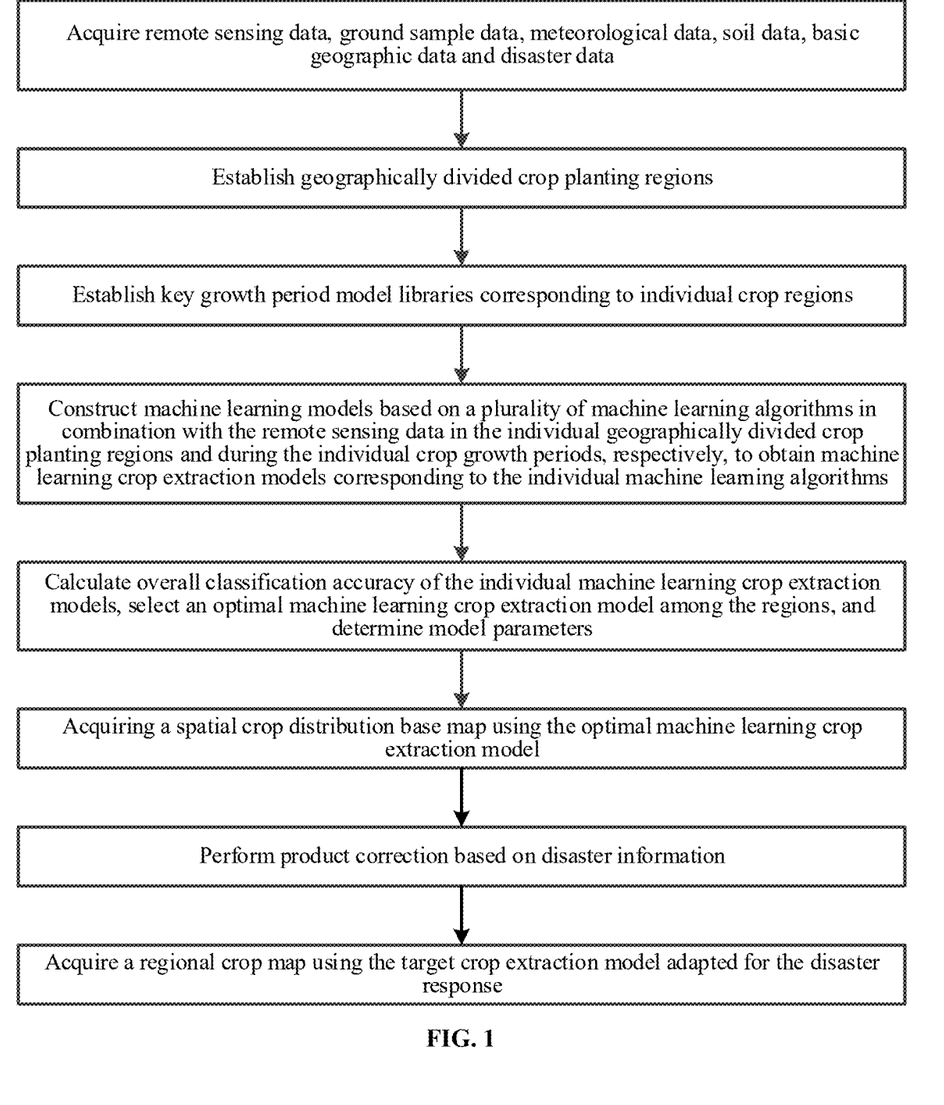
FIG. 1 shows a schematic diagram of a method for crop mapping across large regions with low sample dependence according to Embodiment 1 of the present invention.
Figure 2:
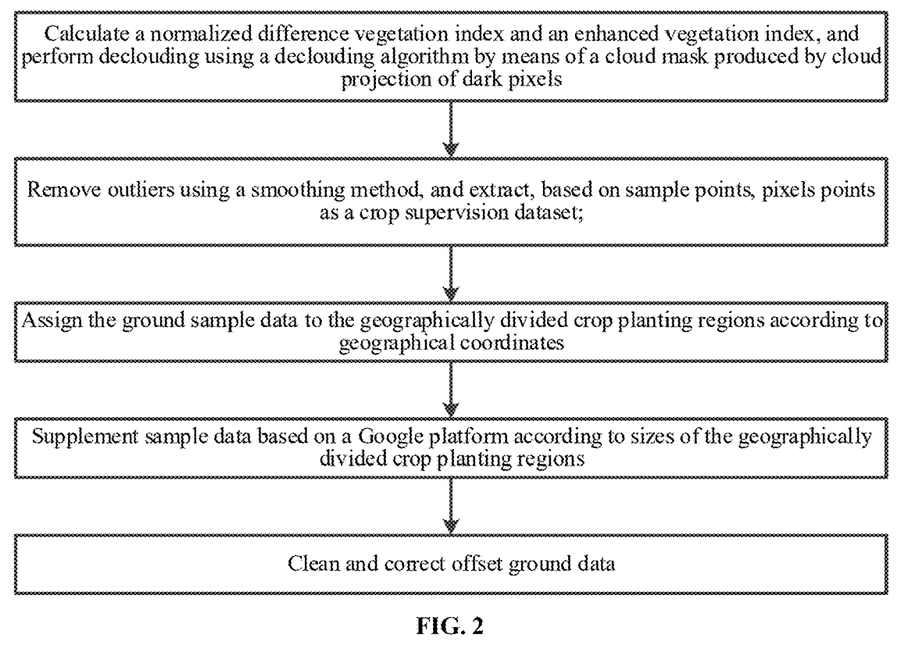
FIG. 2 shows a schematic diagram of establishing key growth period model libraries corresponding to individual crop regions.

As an embodiment, as shown in FIG. 1, in order to solve the above technical problems, this embodiment provides a method for crop mapping across large regions with low sample dependence. The method includes:

acquiring remote sensing data, ground sample data, meteorological data, soil data, basic geographic data and disaster data, the ground sample data including crop type and geographic crop information;

establishing geographically divided crop planting regions according to crop growth periods, the meteorological data, the soil data, and basic geographic data;

as shown in FIG. 2, establishing key growth period model libraries corresponding to individual crop regions, including: calculating a normalized difference vegetation index and an enhanced vegetation index, and performing declouding using a declouding algorithm by means of a cloud mask produced by cloud projection of dark pixels; removing outliers using a smoothing method, and extracting, based on sample points, pixels points as a crop supervision dataset; and assigning the ground sample data to the geographically divided crop planting regions according to geographical coordinates, supplementing sample data based on a Google platform according to sizes of the geographically divided crop planting regions, and cleaning and correcting offset ground data;

constructing machine learning models based on a plurality of machine learning algorithms in combination with the remote sensing data in the individual geographically divided crop planting regions and during the individual crop growth periods, respectively, to obtain machine learning crop extraction models corresponding to the individual machine learning algorithms;

calculating overall classification accuracy of the individual machine learning crop extraction models, selecting an optimal machine learning crop extraction model among the regions, and determining model parameters;

acquiring a spatial crop distribution base map using the optimal machine learning crop extraction model;

performing product correction based on the disaster information, including: in a case where a disaster occurs, determining an abnormal crop recognition region by comparing a current crop map with the spatial crop distribution base map; increasing crop extraction samples in the abnormal crop recognition region, establishing crop extraction models adapted for a disaster response based on a plurality of machine learning algorithms, respectively, and evaluating the individual crop extraction models adapted for the disaster response based on the overall classification accuracy, to obtain a target crop extraction model adapted for the disaster response; and supplementing sample information for a current growth season to correct a target crop extraction model adapted for the disaster response for a last growth period; and acquiring a regional crop map using the target crop extraction model adapted for the disaster response.

The method for crop mapping across large regions with low sample dependence achieves agricultural monitoring with high accuracy, high efficiency and low cost based on the geographically divided crop planting regions, key crop growth period model libraries, abnormality detection and correction, and transfer learning.

Optionally, the remote sensing data include image data and spectroscopic data during the crop growth periods; the meteorological data include data of monthly average precipitation, temperature and evaporation during the crop growth periods; the soil data include soil type data and soil salinity and alkalinity data; the basic geographical data include digital altitude data and topographic data; and the disaster data involve regions affected by floods and droughts in a current year.

The remote sensing data include such as Sentinel-2MSI L2A data during the crop growth period; and the spectroscopic data include such as visible light (B2-B4), red edge (B5-B7), near-infrared (B8/B8A), and short-wave infrared (B11/B12) data. The meteorological data include monthly average precipitation, temperature and evaporation data during the crop growth period from MOIDS products with the spatial resolution of 250 m; the soil data include soil type data and soil salinity and alkalinity data, such as raster data with the spatial resolution of 250 m; the digital altitude data have the spatial resolution of 250 m, for example; and the disaster data involve such as administrative regions affected by floods, droughts and other disasters in a current year.

Optionally, establishing the geographically divided crop planting regions according to the crop growth periods, the meteorological data, the soil data, and basic geographic data includes:

unifying the meteorological data, the soil data, and the geographic crop information during the crop growth periods into the same coordinate system;

standardizing individual secondary indexes of the meteorological data;

performing correlation analysis on meteorological elements to calculate a correlation coefficient matrix;

extracting feature values of the individual indexes and feature vectors corresponding to the feature values, to calculate contribution rates of principal components; and acquiring spatially constrained clustering results by searching for spatially adjacent element clusters based on attribute values of meteorological elements, soil and basic geographic information elements of the principal component, to obtain the geographically divided crop planting regions.

During the establishment of the geographically divided crop planting regions, taking the wheat growth period as an example, the meteorological data, soil data and basic geographic data during the wheat growth period (November to May of the following year) are unified into a unified coordinate system to obtain indexes for crop planting region division, with a total of 25 secondary index layers as shown in Table 1.

TABLE 1

Indexes for Divided Crop Planting Regions

| No. | Primary index | Secondary index |
|---|---|---|
| 1 | Meteorological data | Monthly average precipitation, temperature and evaporation in November, 2022 |
| | | Monthly average precipitation, temperature and evaporation in December, 2022 |
| | | Monthly average precipitation, temperature and evaporation in January, 2023 |
| | | Monthly average precipitation, temperature and evaporation in February, 2023 |
| | | Monthly average precipitation, temperature and evaporation in March, 2023 |
| | | Monthly average precipitation, temperature and evaporation in April, 2023 |
| | | Monthly average precipitation, temperature and evaporation in May, 2023 |
| 2 | Soil data | Soil type data and soil salinity and alkalinity data |
| 3 | Basic geographic information | Digital altitude data and topographic data |

Optionally, standardizing the individual secondary indexes of the meteorological data includes:

assuming that $x_{ij}$ is a value of a jth pixel of an ith index, $x_i$ is a value of all pixels of the ith index, $\overline{x}_i$ is an average value of all the pixels of the ith index, $\sqrt{v(x_i)}$ is a standard deviation of all the pixels of the ith index, n is a maximum value of i, p(1) is a maximum value of j, i=1, 2, ..., n, and j=1, 2, ..., p(1), and supposing that each index has an average value of 0 and a variance of 1, then:

$$x_{ij} = \frac{x_{ij} - \overline{x}_i}{\sqrt{v(x_i)}}.$$

Optionally, performing the correlation analysis on the meteorological elements to calculate the correlation coefficient matrix includes: assuming that $x_i$ is a value of all pixels of an ith index, $x_j$ is a value of all pixels of a jth index, $\overline{x}_i$ is an average value of all the pixels of the ith index, $\overline{x}_j$ is an average value of all the pixels of the jth index, $r_{ij}$ is a correlation coefficient between $x_i$ and $x_j$, the correlation coefficient matrix is R, n is a maximum value of i, p is a maximum value of j, $x_n$ is a value of all pixels of an nth index, $x_p$ is a value of all pixels of an pth index, $r_{np}$ is a correlation coefficient between $x_n$ and $x_p$, i=1, 2, 3, ... n, j=1, 2, 3, ..., p, k indicates a kth index, $x_{ki}$ indicates an ith pixel of a kth index, and $x_{kj}$ indicates a jth pixel of a kth index, then:

$$r_{ij} = \frac{\sum_{i=1}^{n} |x_{ki} - \overline{x}_i||x_{kj} - \overline{x}_j|}{\sqrt{\sum_{k=1}^{n}(x_{ki} - \overline{x}_i)^2(x_{kj} - \overline{x}_j)^2}}; \text{ and}$$

$$R = \begin{pmatrix} r_{11} & r_{12} & \cdots & r_{1p} \\ r_{21} & r_{22} & \cdots & r_{2p} \\ \vdots & \vdots & \cdots & \vdots \\ r_{n1} & r_{n2} & \cdots & r_{np} \end{pmatrix}$$

Optionally, extracting the feature values of the individual indexes and the feature vectors corresponding to the feature values to calculate the contribution rates of the principal components include: assuming that i indicates an ith index, j indicates a jth index, n is a maximum value of i, p is a maximum value of j, $x_n$ is a value of all pixels of an nth index, $x_p$ is a value of all pixels of a pth index, the correlation coefficient matrix is R, a feature value of the ith index is $\lambda_i$, a feature value of a pth index is $\lambda_p$, I is a unit matrix, and $r_{np}$ is a correlation coefficient between $x_n$ and $x_p$, and supposing that $|R-\lambda_1 I|=0$, $|R-\lambda_2 I|=0$, ..., $|R-\lambda_p I|=0$, then:

$$\begin{pmatrix} r_{11}-\lambda_1 & r_{12} & \cdots & r_{1p} \\ r_{21} & r_{22}-\lambda_2 & \cdots & r_{2p} \\ \vdots & \vdots & \cdots & \vdots \\ r_{n1} & r_{n2} & \cdots & r_{np}-\lambda_p \end{pmatrix} = 0;$$

assuming that a feature vector corresponding to a feature value $\lambda_i$ of each index is $\mu_i$, i=1, 2, 3, ..., p, a principal component is $y_i$, and a variance contribution rate of the principal component is $\varepsilon_i$, then:

$$\varepsilon_i = \frac{\lambda_i}{\sum_{i=1}^{p} \lambda_i};$$

and
an accumulated contribution rate of an mth principal component is:

$$\sum_{i=1}^{m} \varepsilon_i = \frac{\sum_{i=1}^{m} \lambda_i}{\sum_{i=1}^{p} \lambda_i}.$$

Five principal components of the meteorological data are selected, with the features values of more than 1 and the accumulated contribution rate of more than 85%, as shown in Table 2.

TABLE 2

Feature Values and Contribution Rates of Principal Components

| Component No. | Feature value | Contribution rate (%) | Accumulated contribution rate (%) |
|---|---|---|---|
| 1 | 7.291 | 34.721 | 34.721 |
| 2 | 4.661 | 22.194 | 56.915 |
| 3 | 3.237 | 15.414 | 72.329 |
| 4 | 2.205 | 10.498 | 82.827 |
| 5 | 1.273 | 6.060 | 88.886 |

Optionally, a grid surface with a given pixel size (e.g., a grid surface of 1000*1000 pixels) is constructed, grid data are acquired, grids are taken as basic analysis units, a unified geographic projection are set with meteorological elements, soil data, and basic geographic information data of principal components, and pixels values of the grid data after the geographic projection are assigned to point data; and spatially adjacent element clusters are searched based on attribute values of the meteorological elements, soil data, and basic geographic information elements of the principal components, to obtain spatially constrained clustering results, which are superimposed with county territory data to obtain division region results.

During the establishment of the key growth period model libraries corresponding to the individual crop regions, the normalized difference vegetation index (NDVI) and the enhanced vegetation index (EVI) are calculated based on the remote sensing data, and the remote sensing data are then declouded using the declouding algorithm by means of a cloud mask produced by cloud projection of dark pixels; and the time domain and time step of each region are set depending on the regions, the median value is synthesized within a time step domain value, and meanwhile, resampling is conducted to 10 m in 20 m bands of B5/6/7/8A/11/12.

Due to the declouding, the remote sensing data may have voids in some regions, and a smoothing method (Whittaker smoother, WS for short) is used to reduce images with outliers. Based on the smoothed data, pixel points are extracted as a crop supervision dataset, according to sample points.

Abnormal values are removed using a smoothing method, and pixels points are extracted as a crop supervision dataset based on sample points; and the ground sample data are assigned to the geographically divided crop planting regions according to geographical coordinates, sample data are supplemented based on a Google platform according to the sizes of the geographically divided crop planting regions, and offset ground data are cleaned and corrected.

Optionally, the machine learning algorithms include a random forest algorithm, a support vector machine algorithm, and an extreme gradient boosting tree algorithm.

During the establishment of the key growth period model libraries corresponding to the individual crop regions, a random forest model, a support vector machine vector and an extreme gradient boosting tree model were trained using a machine learning algorithm by means of the remote sensing data (i.e., the data from November to the current month) in the wintering period (December), reviving-jointing period (March to April), heading period (May), and harvesting period (June) of wheat in different regions, respectively. An optimal model is selected for a region based on the overall classification accuracy to determine optimal model parameters for an optimal machine learning crop extraction model, by which the spatial crop distribution base map was finally obtained.

Figure 3:
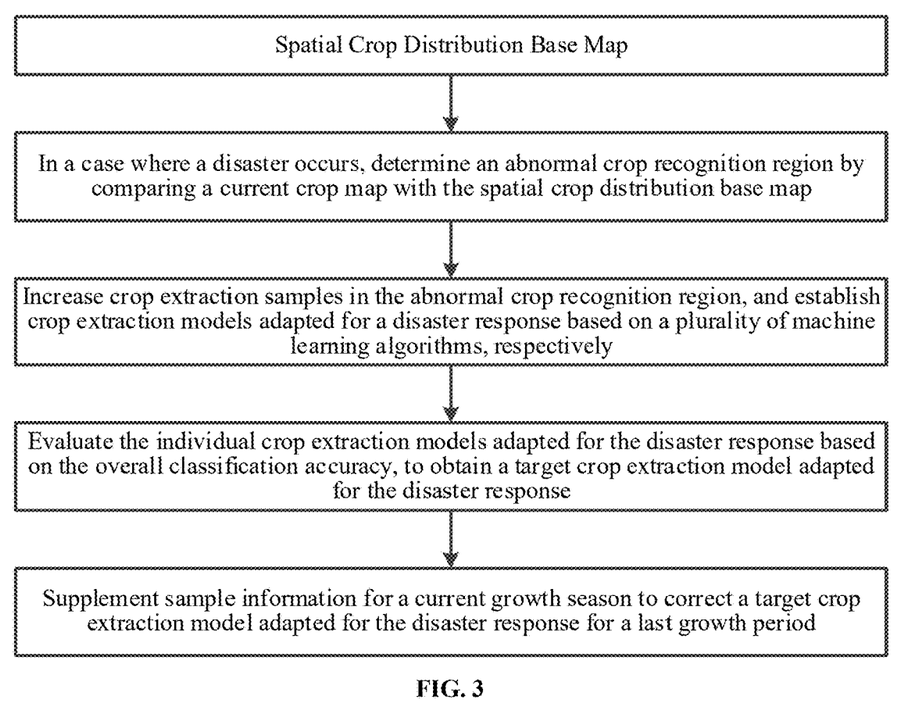
FIG. 3 shows a schematic diagram of performing product correction based on disaster information.

As shown in FIG. 3, establishing the method for product correction based on disaster information specifically includes the following processes:

in a case where a flood disaster occurs, an abnormal crop recognition region is determined by comparing a current spatial crop distribution base map with a preceding growth period base map for change information and in combination with the administrative district where the disaster occurs;

crop extraction samples are increased in the abnormal crop recognition region, random forest crop extraction models adapted for a current disaster response are established based on a random forest, a support vector machine, and an extreme gradient boosting tree, respectively, and different models and parameters are evaluated by using the overall classification accuracy to obtain a target crop extraction model adapted for the disaster response; and little sample information is supplemented in a new growth season, such that the crop extraction model for the last growth season can be corrected, thereby completing product correction for the large-region crop map with low sample dependence in the current year.

By establishing the geographically divided crop planting regions, establishing the key growth period model libraries corresponding to the individual crop regions, performing product correction based on the disaster information, and selecting the optimal machine learning crop extraction model for the regions by calculating the overall classification accuracy of the individual machine learning crop extraction models, the present can solve the problems of great differences in agricultural planting across large regions and poor model adaptability due to topography and landforms, soil, climate and other reasons, and improve the crop recognition accuracy across large regions, to provide more reliably information support for the growth and yield of crop; and the present invention eliminates the limitation of region, time and spatial mobility in the existing crop mapping models, achieves high-accuracy and large-scale crop mapping, and reduces the crop sample dependence and cost for crop mapping.

Embodiment 2

Figure 4:
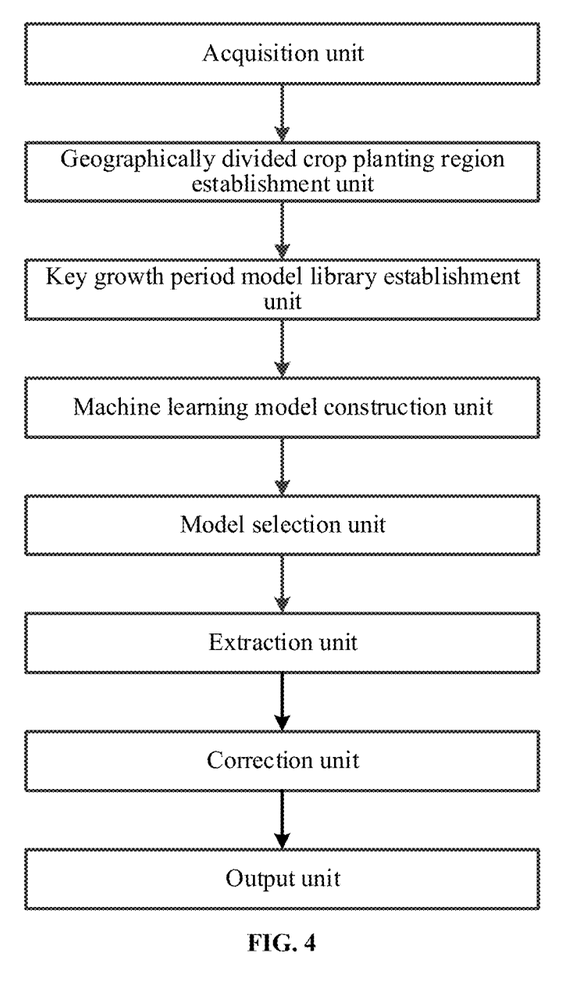
FIG. 4 shows a schematic diagram of a system for crop mapping across large regions with low sample dependence according to Embodiment 2 of the present invention.

Based on the same principle as Embodiment 1, as shown in FIG. 4, this embodiment provides a system for crop mapping across large regions with low sample dependence, including: an acquisition unit, a geographically divided crop planting region establishment unit, a key growth period model library establishment unit, a machine learning model construction unit, a unit selection unit, an extraction unit, a correction unit, and an output unit.

The acquisition unit is configured to acquire remote sensing data, ground sample data, meteorological data, soil data, basic geographic data and disaster data, the ground sample data including crop type and geographic crop information.

The geographically divided crop planting region establishment unit is configured to establish geographically divided crop planting regions according to crop growth periods, the meteorological data, the soil data, and basic geographic data.

The key growth period model library establishment unit is configured to establish key growth period model libraries corresponding to individual crop regions, including: calculating a normalized difference vegetation index and an enhanced vegetation index, and performing declouding using a declouding algorithm by means of a cloud mask produced by cloud projection of dark pixels; removing outliers using a smoothing method, and extracting, based on sample points, pixels points as a crop supervision dataset; and assigning the ground sample data to the geographically divided crop planting regions according to geographical coordinates, supplementing sample data based on a Google platform according to sizes of the geographically divided crop planting regions, and cleaning and correcting offset ground data.

The machine learning model construction unit is configured to construct machine learning models based on a plurality of machine learning algorithms in combination with the remote sensing data in the individual geographically divided crop planting regions and during the individual crop growth periods, respectively, to obtain machine learning crop extraction models corresponding to the individual machine learning algorithms.

The model selection unit is configured to calculate overall classification accuracy of the individual machine learning crop extraction models, selecting an optimal machine learning crop extraction model among the regions, and determining model parameters.

The extraction unit is configured to acquire a spatial crop distribution base map using the optimal machine learning crop extraction model.

The correction unit is configured to perform product correction based on the disaster information, including: in a case where a disaster occurs, determining an abnormal crop recognition region by comparing a current crop map with the spatial crop distribution base map; increasing crop extraction samples in the abnormal crop recognition region, establishing crop extraction models adapted for a disaster response based on a plurality of machine learning algorithms, respectively, and evaluating the individual crop extraction models adapted for the disaster response based on the overall classification accuracy, to obtain a target crop extraction model adapted for the disaster response; and supplementing sample information for a current growth season to correct a target crop extraction model adapted for the disaster response for a last growth period.

The output unit is configured to acquire a regional crop map using the target crop extraction model adapted for the disaster response.

Optionally, the remote sensing data include image data and spectroscopic data during the crop growth periods; the meteorological data include data of monthly average precipitation, temperature and evaporation during the crop growth periods; the soil data include soil type data and soil salinity and alkalinity data; the basic geographical data include digital altitude data and topographic data; and the disaster data involve regions affected by floods and droughts in a current year.

Optionally, establishing the geographically divided crop planting regions according to the crop growth periods, the meteorological data, the soil data, and basic geographic data includes:

unifying the meteorological data, the soil data, and the geographic crop information during the crop growth periods into the same coordinate system;

standardizing individual secondary indexes of the meteorological data;

performing correlation analysis on meteorological elements to calculate a correlation coefficient matrix;

extracting feature values of the individual indexes and feature vectors corresponding to the feature values, to calculate contribution rates of principal components; and acquiring spatially constrained clustering results by searching for spatially adjacent element clusters based on attribute values of meteorological elements, soil and basic geographic information elements of the principal component, to obtain the geographically divided crop planting regions.

Optionally, standardizing the individual secondary indexes of the meteorological data includes:

assuming that $x_{ij}$ is a value of a jth pixel of an ith index, $x_i$ is a value of all pixels of the ith index, $\bar{x}_i$ is an average value of all the pixels of the ith index, $\sqrt{v(x_i)}$ is a standard deviation of all the pixels of the ith index, n is a maximum value of i, p(1) is a maximum value of j, i=1, 2, ..., n, and j=1, 2, ..., p(1), and supposing that each index has an average value of 0 and a variance of 1, then:

$$x_{ij} = \frac{x_{ij} - \bar{x}_i}{\sqrt{v(x_i)}}.$$

Optionally, performing the correlation analysis on the meteorological elements to calculate the correlation coefficient matrix includes: assuming that $x_i$ is a value of all pixels of an ith index, $x_j$ is a value of all pixels of a jth index, $\bar{x}_i$ is an average value of all the pixels of the ith index, $\bar{x}_j$ is an average value of all the pixels of the jth index, $r_{ij}$ is a correlation coefficient between $x_i$ and $x_j$, the correlation coefficient matrix is R, n is a maximum value of i, p is a maximum value of j, $x_n$ is a value of all pixels of an nth index, $x_p$ is a value of all pixels of a pth index, $r_{np}$ is a correlation coefficient between $x_n$ and $x_p$, i=1, 2, 3, ... n, j=1, 2, 3, ..., p, k indicates a kth index, $x_{ki}$ indicates an ith pixel of a kth index, and $x_{kj}$ indicates a jth pixel of a kth index, then:

$$r_{ij} = \frac{\sum_{i=1}^{n}|x_{ki}-\bar{x}_i||x_{kj}-\bar{x}_j|}{\sqrt{\sum_{k=1}^{n}(x_{ki}-\bar{x}_i)^2(x_{kj}-\bar{x}_j)^2}}; \text{ and}$$

$$R = \begin{pmatrix} r_{11} & r_{12} & \cdots & r_{1p} \\ r_{21} & r_{22} & \cdots & r_{2p} \\ \vdots & \vdots & \cdots & \vdots \\ r_{n1} & r_{n2} & \cdots & r_{np} \end{pmatrix}$$

Optionally, extracting the feature values of the individual indexes and the feature vectors corresponding to the feature values to calculate the contribution rates of the principal components include: assuming that i indicates an ith index, j indicates a jth index, n is a maximum value of i, p is a maximum value of j, $x_n$ is a value of all pixels of an nth index, $x_p$ is a value of all pixels of a pth index, the correlation coefficient matrix is R, a feature value of the ith index is $\lambda_i$, a feature value of a pth index is $\lambda_p$, I is a unit matrix, and $r_{np}$ is a correlation coefficient between $x_n$ and $x_p$, and supposing that $|R-\lambda_1 I|=0$, $|R-\lambda_2 I|=0$, ..., $|R-\lambda_p I|=0$, then:

$$\begin{pmatrix} r_{11}-\lambda_1 & r_{12} & \cdots & r_{1p} \\ r_{21} & r_{22}-\lambda_2 & \cdots & r_{2p} \\ \vdots & \vdots & \cdots & \vdots \\ r_{n1} & r_{n2} & \cdots & r_{np}-\lambda_p \end{pmatrix} = 0;$$

assuming that a feature vector corresponding to a feature value $\lambda_i$ of each index is $\mu_i$, i=1, 2, 3, ..., p, a principal component is $y_i$, and a variance contribution rate of the principal component is $\varepsilon_i$, then:

$$\varepsilon_i = \frac{\lambda_i}{\sum_{i=1}^{p}\lambda_i};$$

and an accumulated contribution rate of an mth principal component is:

$$\sum_{i=1}^{m}\varepsilon_i = \frac{\sum_{i=1}^{m}\lambda_i}{\sum_{i=1}^{p}\lambda_i}.$$

Optionally, a grid surface with a given pixel size is constructed, grid data are acquired, grids are taken as basic analysis units, a unified geographic projection are set with meteorological elements, soil data, and basic geographic information data of principal components, and pixels values of the grid data after the geographic projection are assigned to point data; and spatially adjacent element clusters are searched based on attribute values of the meteorological elements, soil data, and basic geographic information elements of the principal components, to obtain spatially constrained clustering results, which are superimposed with county territory data to obtain division region results.

Optionally, the machine learning algorithms include a random forest algorithm, a support vector machine algorithm, and an extreme gradient boosting tree algorithm.

Described above are only preferred embodiments of the present invention, which are not intended to limit the present invention. Various changes and variations can be made to the present invention for those skilled in the art. Within the spirit and principle of the present invention, any modifications, equivalent substitutions, improvements and the like are construed as falling within the protection scope of the present invention.

What is claimed is:

1. A method for crop mapping across large regions with low sample dependence, comprising:
    acquiring remote sensing data, ground sample data, meteorological data, soil data, basic geographic data and disaster data, the ground sample data comprising crop type and geographic crop information;
    establishing geographically divided crop planting regions according to crop growth periods, the meteorological data, the soil data, and basic geographic data;
    establishing key growth period model libraries corresponding to individual crop regions, comprising: calculating a normalized difference vegetation index and an enhanced vegetation index, and performing declouding using a declouding algorithm by means of a cloud mask produced by cloud projection of dark pixels; removing outliers using a smoothing method, and extracting, based on sample points, pixels points as a crop supervision dataset; and assigning the ground sample data to the geographically divided crop planting regions according to geographical coordinates, supplementing sample data based on a network platform according to sizes of the geographically divided crop planting regions, and cleaning and correcting offset ground data;
    constructing machine learning models based on a plurality of machine learning algorithms in combination with the remote sensing data in the individual geographically divided crop planting regions and during the individual crop growth periods, respectively, to obtain machine learning crop extraction models corresponding to the individual machine learning algorithms;
    calculating overall classification accuracy of the individual machine learning crop extraction models, selecting an optimal machine learning crop extraction model among the regions, and determining model parameters;
    acquiring a spatial crop distribution base map using the optimal machine learning crop extraction model;
    performing product correction based on the disaster information, comprising: in a case where a disaster occurs, determining an abnormal crop recognition region by comparing a current crop map with the spatial crop distribution base map; increasing crop extraction samples in the abnormal crop recognition region, establishing crop extraction models adapted for a disaster response based on a plurality of machine learning algorithms, respectively, and evaluating the individual crop extraction models adapted for the disaster response based on the overall classification accuracy, to obtain a target crop extraction model adapted for the disaster response; and supplementing sample information for a current growth season to correct a target crop extraction model adapted for the disaster response for a last growth period; and acquiring a regional crop map using the target crop extraction model adapted for the disaster response.

2. The method for crop mapping across large regions with low sample dependence according to claim 1, wherein the remote sensing data comprise image data and spectroscopic data during the crop growth periods; the meteorological data comprise data of monthly average precipitation, temperature and evaporation during the crop growth periods; the soil data comprise soil type data and soil salinity and alkalinity data; the basic geographical data comprise digital altitude data and topographic data; and the disaster data involve regions affected by floods and droughts in a current year.

3. The method for crop mapping across large regions with low sample dependence according to claim 1, wherein establishing the geographically divided crop planting regions according to the crop growth periods, the meteorological data, the soil data and the basic geographic data comprises:

unifying the meteorological data, the soil data, and the geographic crop information during the crop growth periods into the same coordinate system;

standardizing individual secondary indexes of the meteorological data;

performing correlation analysis on meteorological elements to calculate a correlation coefficient matrix;

extracting feature values of the individual indexes and feature vectors corresponding to the feature values, to calculate contribution rates of principal components; and acquiring spatially constrained clustering results by searching for spatially adjacent element clusters based on attribute values of meteorological elements, soil and basic geographic information elements of the principal component, to obtain the geographically divided crop planting regions.

4. The method for crop mapping across large regions with low sample dependence according to claim 3, wherein standardizing the individual secondary indexes of the meteorological data comprises:

assuming that $x_{ij}$ is a value of a jth pixel of an ith index, $x_i$ is a value of all pixels of the ith index, $\overline{x_i}$ is an average value of all the pixels of the ith index, $\sqrt{v(x_i)}$ is a standard deviation of all the pixels of the ith index, n is a maximum value of i, p is a maximum value of j, i=1, 2, ..., n, and j=1, 2, 3, ..., p, and supposing that each index has an average value of 0 and a variance of 1, then:

$$x_{ij} = \frac{x_{ij} - \overline{x_i}}{\sqrt{v(x_i)}}.$$

5. The method for crop mapping across large regions with low sample dependence according to claim 1, wherein performing the correlation analysis on the meteorological elements to calculate the correlation coefficient matrix comprises: assuming that $x_i$ is a value of all pixels of an ith index, $x_j$ is a value of all pixels of a jth index, $\overline{x_i}$ is an average value of all the pixels of the ith index, $\overline{x_j}$ is an average value of all the pixels of the jth index, $r_{ij}$ is a correlation coefficient between $x_i$ and $x_j$, the correlation coefficient matrix is R, n is a maximum value of i, p is a maximum value of j, $x_n$ is a value of all pixels of an nth index, $x_p$ is a value of all pixels of a pth index, $r_{np}$ is a correlation coefficient between $x_n$ and $x_p$, i=1, 2, 3, ... n, j=1, 2, 3, ..., p, k indicates a kth index, $x_{ki}$ indicates an ith pixel of a kth index, and $x_{kj}$ indicates a jth pixel of a kth index, then:

$$r_{ij} = \frac{\sum_{i=1}^{n}|x_{ki} - \overline{x_i}||x_{kj} - \overline{x_j}|}{\sqrt{\sum_{k=1}^{n}(x_{ki} - \overline{x_i})^2(x_{kj} - \overline{x_j})^2}}; \text{ and}.$$

$$R = \begin{pmatrix} r_{11} & r_{12} & \cdots & r_{1p} \\ r_{21} & r_{22} & \cdots & r_{2p} \\ \vdots & \vdots & \cdots & \vdots \\ r_{n1} & r_{n2} & \cdots & r_{np} \end{pmatrix}$$

6. The method for crop mapping across large regions with low sample dependence according to claim 1, wherein extracting the feature values of the individual indexes and the feature vectors corresponding to the feature values to calculate the contribution rates of the principal components comprise: assuming that i indicates an ith index, j indicates a jth index, n is a maximum value of i, p is a maximum value of j, $x_n$ is a value of all pixels of an nth index, $x_p$ is a value of all pixels of a pth index, the correlation coefficient matrix is R, a feature value of the ith index is $\lambda_i$, a feature value of a pth index is $\lambda_p$, I is a unit matrix, and $r_{np}$ is a correlation coefficient between $x_n$ and $x_p$, and supposing that $|R-\lambda_1 I|=0$, $|R-\lambda_2 I|=0$, ..., $|R-\lambda_p I|=0$, then:

$$\begin{pmatrix} r_{11}-\lambda_1 & r_{12} & \cdots & r_{1p} \\ r_{21} & r_{22}-\lambda_2 & \cdots & r_{2p} \\ \vdots & \vdots & \cdots & \vdots \\ r_{n1} & r_{n2} & \cdots & r_{np}-\lambda_p \end{pmatrix} = 0;$$

assuming that a feature vector corresponding to a feature value $\lambda_i$ of each index is $\mu_i$, i=1, 2, 3, ..., n, a principal component is $y_i$, and a variance contribution rate of the principal component is $\varepsilon_i$, then:

$$\varepsilon_i = \frac{\lambda_i}{\sum_{i=1}^{p}\lambda_i};$$

and an accumulated contribution rate of an mth principal component is:

$$\sum_{i=1}^{m}\varepsilon_i = \frac{\sum_{i=1}^{m}\lambda_i}{\sum_{i=1}^{p}\lambda_i}.$$

7. The method for crop mapping across large regions with low sample dependence according to claim 1, wherein a grid surface with a given pixel size is constructed, grid data are acquired, grids are taken as basic analysis units, a unified geographic projection are set with meteorological elements, soil data, and basic geographic information data of principal components, and pixels values of the grid data after the geographic projection are assigned to point data; and spatially adjacent element clusters are searched based on attribute values of the meteorological elements, soil data, and basic geographic information elements of the principal components, to obtain spatially constrained clustering results, which are superimposed with county territory data to obtain division region results.

8. The method for crop mapping across large regions with low sample dependence according to claim 1, wherein the machine learning algorithms comprise a random forest algorithm, a support vector machine algorithm, and an extreme gradient boosting tree algorithm.

9. A system for crop mapping across large regions with low sample dependence, comprising: an acquisition unit, a geographically divided crop planting region establishment unit, a key growth period model library establishment unit, a machine learning model construction unit, a unit selection unit, an extraction unit, a correction unit, and an output unit, wherein the acquisition unit is configured to acquire remote sensing data, ground sample data, meteorological data, soil data, basic geographic data and disaster data, the ground sample data comprising crop type and geographic crop information;

the geographically divided crop planting region establishment unit is configured to establish geographically divided crop planting regions according to crop growth periods, the meteorological data, the soil data, and basic geographic data;

the key growth period model library establishment unit is configured to establish key growth period model libraries corresponding to individual crop regions, comprising: calculating a normalized difference vegetation index and an enhanced vegetation index, and performing declouding using a declouding algorithm by means of a cloud mask produced by cloud projection of dark pixels; removing outliers using a smoothing method, and extracting, based on sample points, pixels points as a crop supervision dataset; and assigning the ground sample data to the geographically divided crop planting regions according to geographical coordinates, supplementing sample data based on a network platform according to sizes of the geographically divided crop planting regions, and cleaning and correcting offset ground data;

the machine learning model construction unit is configured to construct machine learning models based on a plurality of machine learning algorithms in combination with the remote sensing data in the individual geographically divided crop planting regions and during the individual crop growth periods, respectively, to obtain machine learning crop extraction models corresponding to the individual machine learning algorithms;

the model selection unit is configured to calculate overall classification accuracy of the individual machine learning crop extraction models, selecting an optimal machine learning crop extraction model among the regions, and determining model parameters;

the extraction unit is configured to acquire a spatial crop distribution base map using the optimal machine learning crop extraction model;

the correction unit is configured to perform product correction based on the disaster information, comprising: in a case where a disaster occurs, determining an abnormal crop recognition region by comparing a current crop map with the spatial crop distribution base map; increasing crop extraction samples in the abnormal crop recognition region, establishing crop extraction models adapted for a disaster response based on a plurality of machine learning algorithms, respectively, and evaluating the individual crop extraction models adapted for the disaster response based on the overall classification accuracy, to obtain a target crop extraction model adapted for the disaster response; and supplementing sample information for a current growth season to correct a target crop extraction model adapted for the disaster response for a last growth period; and the output unit is configured to acquire a regional crop map using the target crop extraction model adapted for the disaster response.

\* \* \* \* \*